United States Patent [19]
Henderson et al.

[11] Patent Number: 5,182,501
[45] Date of Patent: Jan. 26, 1993

[54] DUAL MOTOR WINDSHIELD WIPER CONTROL SYSTEM

[75] Inventors: Daniel E. Henderson, Washington; William E. Allen, Peoria, both of Ill.

[73] Assignee: Caterpillar Inc., Peoria, Ill.

[21] Appl. No.: 763,019

[22] Filed: Sep. 20, 1991

[51] Int. Cl.$^5$ .............................................. B60S 1/08
[52] U.S. Cl. .................................... 318/443; 318/41; 318/444; 318/DIG. 2
[58] Field of Search ................. 318/443, 444, DIG. 2, 318/34, 41, 49, 85, 112; 15/250.17

[56] References Cited

U.S. PATENT DOCUMENTS

| | | | |
|---|---|---|---|
| 4,405,887 | 9/1983 | Tamura et al. | 318/443 |
| 4,431,954 | 2/1984 | Carpenter et al. | 318/443 |
| 4,585,980 | 4/1986 | Gille et al. | 318/444 |
| 4,665,488 | 5/1987 | Graham et al. | 364/424 |
| 4,670,695 | 6/1987 | Licata et al. | 318/443 |
| 4,723,101 | 2/1988 | Bauer et al. | 318/443 |
| 4,900,996 | 2/1990 | Wainwright | 318/443 |

Primary Examiner—Bentsu Ro
Attorney, Agent, or Firm—Stephen L. Noe

[57] ABSTRACT

Windshield wiper systems are commonly used on vehicles that must operate out-of-doors. In systems employing two or more wiper elements, each operating from an individual wiper motor, some mechanism must be employed to prevent out-of-sync operation from causing the wiper elements to collide if they operate in an overlap area. The instant wiper system includes first and second electric motors each drivingly connected to a respective windshield wiper element. Switching devices selectively controllably provide electrical power to the motors in response to receiving respective motor control signals. Synchronizing devices provide first and second synchronizing signals in response to the respective wiper elements being positioned at corresponding predetermined cycle start locations. A logic circuit controllably produces the motor control signals in response to receiving the respective synchronizing signals.

2 Claims, 3 Drawing Sheets

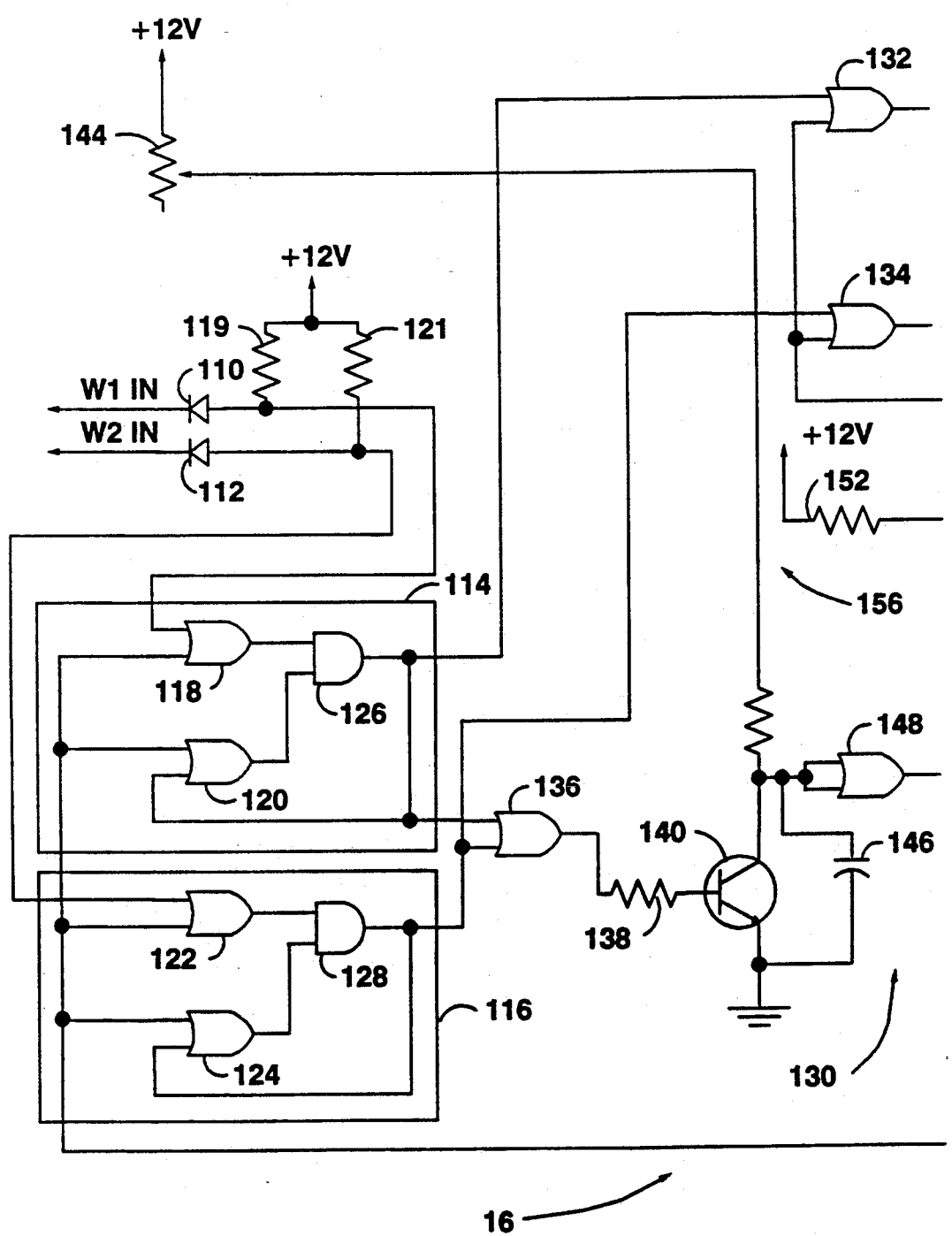
Fig_2A_

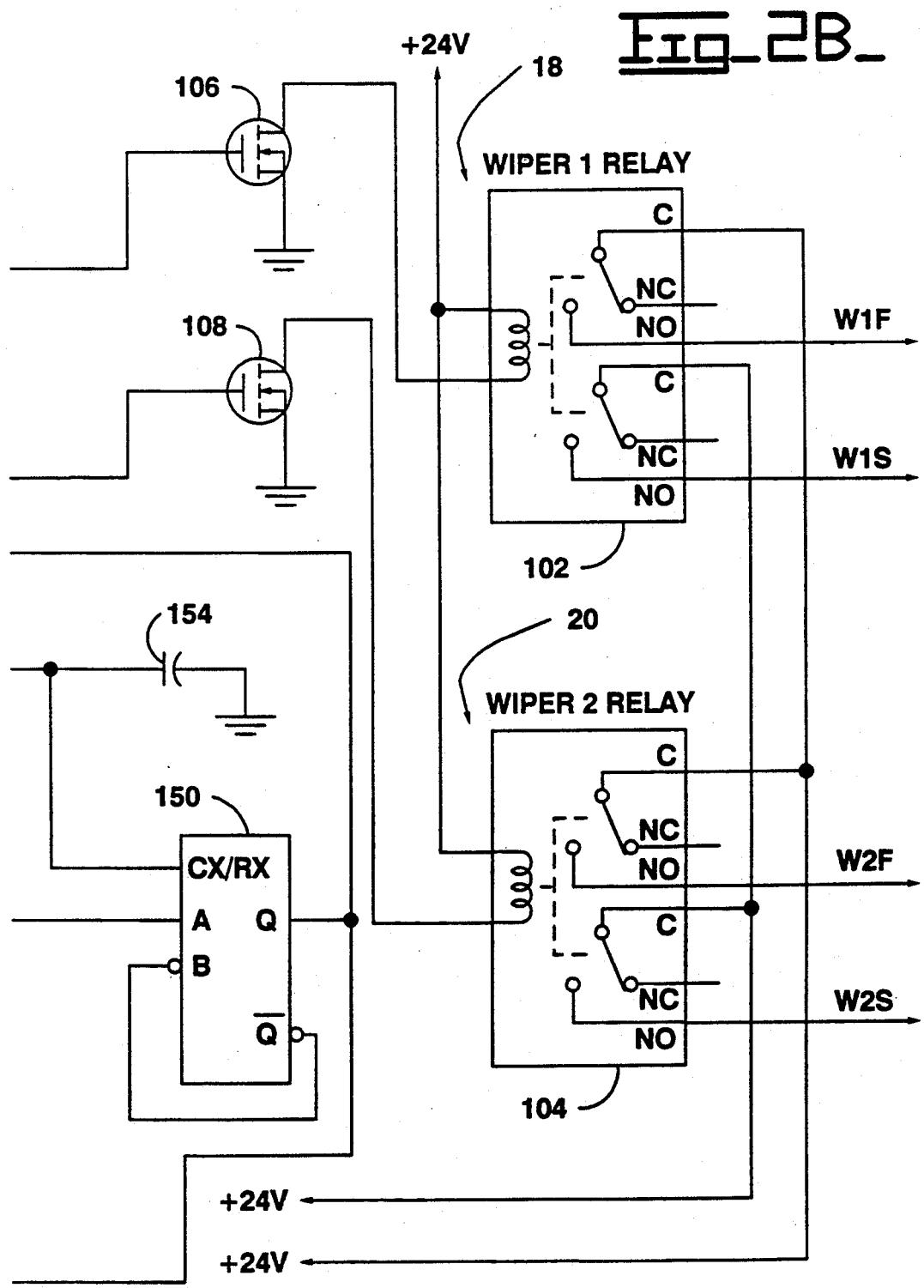

DUAL MOTOR WINDSHIELD WIPER CONTROL SYSTEM

DESCRIPTION

1. Technical Field

This invention relates generally to a windshield wiper system and, more particularly, to an anti-collision control for a dual motor windshield wiper system.

2. Background Art

Several basic types of windshield wiper systems are in common use today. In the simplest form, a single windshield wiper element or blade is attached to a single motor and is used as the sole means of removing moisture from the windshield. Generally, a single wiper blade is not sufficient to cover the width of a windshield and multiple blade systems are required. At least three configurations are known for multiple blade systems. In a first system, typically used on passenger cars, at least two blades are connected via a suitable linkage to a single wiper motor. The linkage causes the blades to move in the same relative direction at the same time and to clear the windshield in an overlapping pattern. Another system, often used on vehicles having split windshields, utilizes two independent motors driving a pair of nonsynchronized wiper elements that do not overlap at any point of their travel. A third system uses independent motors to drive two or more separate wiper elements that do overlap at some point in their travel. In this system the blades typically move in opposing directions and are provided with anti-collision capability. This is normally done by driving the blades at different relative speeds over certain portions of their travel, thus preventing collisions.

In some instances it is desirable to move the blades in the same relative direction but to eliminate complicated linkages by using two independent motors. In such a case, it is again necessary to provide some mechanism by which the blades can be prevented from colliding at any point during their travel. The present invention is directed to accomplish this result by overcoming the problems as set forth above.

DISCLOSURE OF THE INVENTION

In one aspect of the present invention, a windshield wiper system includes first and second electric motors, each drivingly connected to respective windshield wiper elements. Switches are provided to selectively, controllably provide electrical power to the first and second electric motors in response to receiving motor control signals. A synchronizing device provides first and second synchronizing signals in response to the respective wiper elements being positioned at corresponding predetermined cycle start locations. Logic circuitry controllably produces the motor control signals in response to receiving the first and second synchronizing signals.

The present invention provides a windshield wiper system that utilizes dual motors and an overlapping windshield wiper pattern while avoiding collision between the wipers during the overlap portion of a wiping cycle.

BRIEF DESCRIPTION OF THE DRAWINGS

FIGS. 2A and 2B constitute a schematic diagram of logic circuitry associated with an embodiment of the present invention.

BEST MODE FOR CARRYING OUT THE INVENTION

Figure 1:
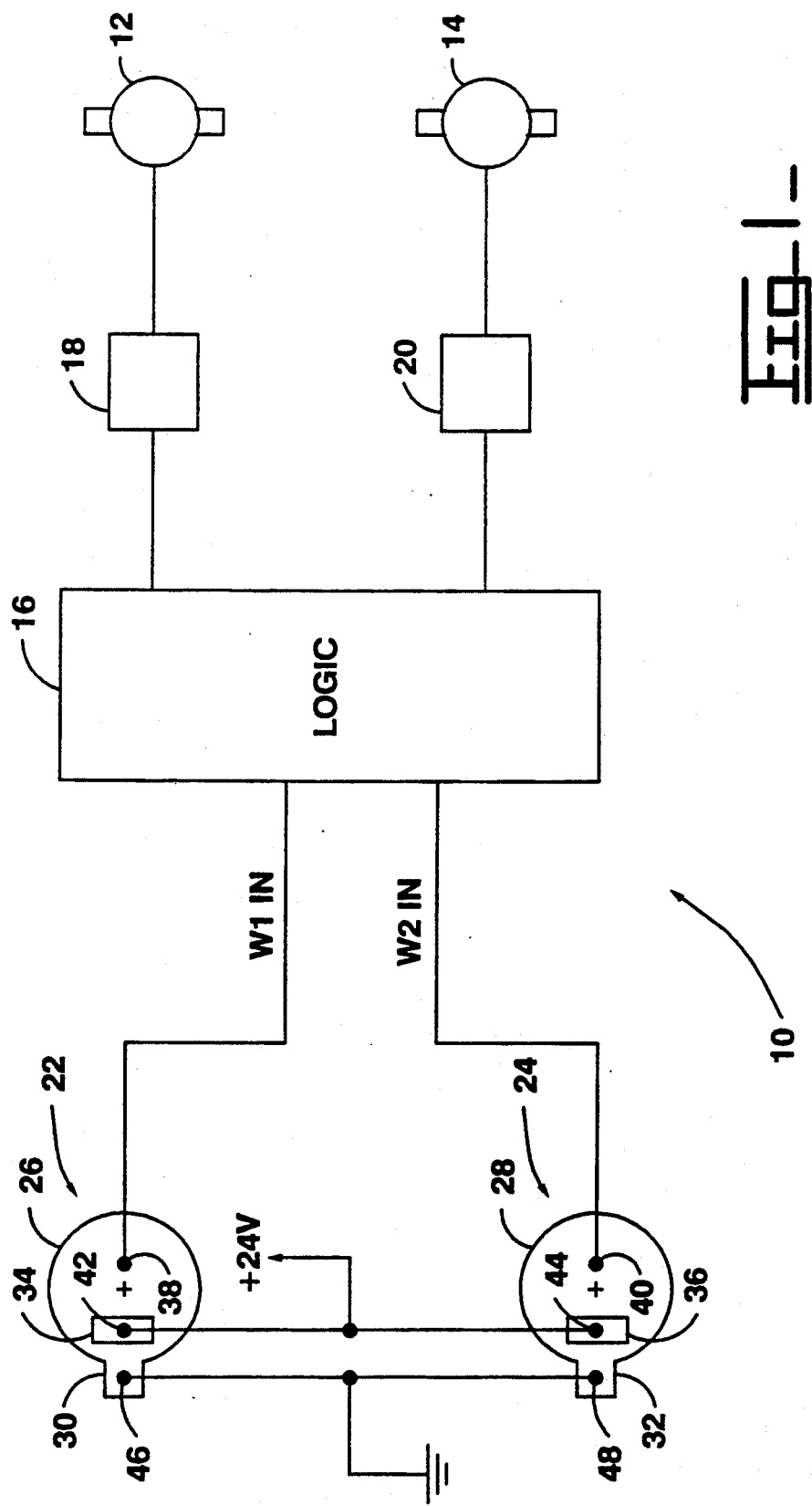
FIG. 1 is a schematized block diagram of a windshield wiper system in accordance with the present invention.

Referring first to FIG. 1, an apparatus embodying certain of the principles of the present invention is generally indicated by the reference numeral 10. It should be understood that the following detailed description relates to the best presently known embodiment of the apparatus 10. However, the apparatus 10 can assume numerous other embodiments, as will become apparent to those skilled in the art, without departing from the appended claims.

In FIG. 1, the apparatus 10 is shown to include first and second electric motors 12,14. Each of the motors 12,14 is drivingly connected to respective windshield wiper elements. This is a common arrangement in windshield wiper systems and the individual wiper elements and connecting linkages are not shown.

A logic means 16 controllably produces motor control signals in response to receiving first and second synchronizing signals. Switching means 18,20 selectively controllably provide electric power to the first and second electric motors 12,14 in response to receiving respective motor control signals.

Synchronizing means 22,24 provide first and second synchronizing signals in response to the respective motor shafts and attached wiper elements being positioned at corresponding predetermined cycle start locations. The synchronizing means 22,24 include identical switching devices that are, in the preferred embodiment, located within the housings of the respective motors 12,14. Each of the synchronizing means 22,24 includes a rotatable conductive disc element or member 26,28 drivingly connected to the shaft of the respective motor 12,14. Each of the elements 26,28 includes a tab portion 30,32 and a cutout portion 34,36. Three mechanical contact elements are associated with each of the synchronizing means 22,24. The first contact element 38,40 is positioned such that it is in contact with the respective rotating disc 26,28 throughout an entire 360 degree rotation. A second contact element 42,44 is positioned at the same radial distance from the center of the respective rotating disc 26,28 as the cutout portion 34,36 such that at one particular angular rotational position of the rotating disc 26,28, the respective contact element 42,44 is directly coincident with the cutout portion 34,36. A third contact element 46,48 is positioned at the same radial distance from the center of the respective rotating disc 26,28 as the tab portion 30,32 in such a manner that at one particular rotational angular position of the rotating disc 26,28, the respective contact element 46,48 is directly coincident with the tab portion 30,32.

Referring now to FIG. 2, the logic means 16 and switching means 18,20 are shown in detail. The switching means 18,20 are individual wiper relays 102,104. The drive coils for these relays 102,104 are connected between a power source and respective drive transistors 106,108. When the drive transistors 106,108 are turned on, the coils are connected between the source of power and ground completing a circuit and energizing the relays 102,104.

Output terminals of the relays 102,104 are connected to the respective wiper motors 12,14 and permit power to flow through the wiper motors 12,14 from a power source in a conventional manner. Advantageously, circuits within the motors 12,14 and separate power supply circuits associated with the relays 102,104 can cause the motors 12,14 to operate at one of a plurality of different motor speeds. In the example shown in FIG. 2, dual speed motors are utilized.

Output terminals from the synchronizing means 22,24 are connected to the logic means: 16 at the points W1 IN and W2 IN. These input connections deliver the synchronizing signals from the synchronizing means 22,24 to the logic means 16. The synchronizing signals are delivered through isolation diodes 110,112 to respective input terminals of first and second latches 114,116. Respective pull-up resistors 119,121 are likewise connected to the input terminals of the latches 114,116.

Each of the latches 114,116 is composed of first and second OR gates 118,120,122,124 and an AND gate 126,128. The logical operation of the latches 114,116 is described in detail below. Output terminals from the latches 114,116 are connected to a timer circuit 130 and to respective ones of a pair of OR gates 132,134. The output terminal of the timer circuit 130 is also connected to input terminals of the OR gates 132,134 and to input terminals of the latches 114,116. The output terminals of the OR gates 132,134 are connected to respective ones of the drive transistors 106,108.

The timer circuit 130 includes an OR gate 136 having respective input terminals connected to the latches 114,116. The output terminal of the OR gate 136 is connected through a resistor 138 to a transistor 140. The emitter of the transistor 140 is connected to ground, while the collector of the transistor 140 is connected through a resistor 142 to the wiper of a potentiometer 144. The resistive element of the potentiometer 144 is connected to a voltage source. A capacitor 146 is connected across the collector and emitter elements of the transistor 140. The collector of the transistor 140 is also connected to a buffer 148, the output terminal of which is connected to the input terminal of a monostable multivibrator 150. A series resistor 152 and capacitor 154 are connected between a voltage source and ground. The junction between the resistor 152 and capacitor 154 is also connected to the monostable multivibrator 150 and determines the length of the pulses produced by the multivibrator 150. The output terminal of the monostable multivibrator 150 is connected to the input terminals of the OR gates 132,134 and to input terminals of the latches 114,116. The timer circuit 130 and associated components comprise a delay means 156 for controllably inhibiting the motor control signals for preselected variable periods of time following receipt by the logic means 16 of the synchronizing signals.

Industrial Applicability

Operation of the apparatus 10 is best described in its actual use on a vehicle having dual independent windshield wipers that overlap through at least a portion of the wiping cycle, and that normally moves in the same relative direction at the same time. In such case, it is necessary that the wipers be synchronized in such a manner that they avoid colliding with one another. The premise of the system described is that the wipers will be synchronized at least one point during each complete wiping cycle. Because the speed of the wiper motors 12,14 is reasonably well matched, the wipers will not become enough out of phase during the course of a single cycle to allow collision to occur.

The synchronizing means 22,24 provides the synchronizing signals that the logic means 16 uses to control the motor 12,14 operation. Referring first to FIG. 1, with the synchronizing means 22,24 in the orientation shown logic level 0 signals are provided at the W1 IN and W2 IN terminals. This is in response to the discs 26,28 being at ground potential by virtue of the tab portions 30,32 being in contact with the grounded contact elements 46,48. In this state, and referring now to FIG. 2, the output signals delivered from the latches 114,116 are both at a logic 0 level and the transistor 140 is turned off. This permits the capacitor 146 to charge through the potentiometer 144 and resistor 142, eventually triggering the monostable multivibrator 150 and causing it to provide an enable pulse to the OR gates 132,134. Responsively, and assuming that the wiper circuitry is enabled, the transistors 106,108 are turned on, energizing the relays 102,104 and providing power to the wiper motors 12,14.

As the discs 26,28 begin to rotate, the tab portions 30,32 lose contact with the grounded contacts 46,48 and, a short time later, the discs 26,28 are brought into contact with a positive supply voltage at the second contact elements 42,44. Therefore, the logic 1 signal is now delivered at the W1 IN and W2 IN terminals. However, the latches 114,116 now produce a logic 1 signal at their output terminals in response to the pulse from the monostable multivibrator 150 having been applied to one input terminal of each of the first and second OR gates 118,120,122,124. These logic 1 signals are delivered to respective input terminals of the OR gates 132,134 and continue to cause power to be provided to the relays 102,104. As each of the discs 26,28 completes a cycle and is again connected to ground by the respective tabs 30,32, the logic signal delivered from the latches 114,116 falls to a level 0 and the respective transistor drivers 106,108 are turned off. Responsively, power is removed from the associated wiper motor 12,14. During the time that either of the latches 114,116 delivers a logic 1 signal at the respective output terminal, the OR gate 136 provides a signal sufficient to turn on the transistor 140, discharging the capacitor 146. Therefore, the pulse delivered from the monostable multivibrator 150 cannot be again produced until both of the wiper motors 12,14 have completed a full cycle and the synchronizing signals are again received by the logic means 16.

The amount of time required to charge the capacitor 146 once the wipers are synchronized at a predetermined cycle start location is determined by the combined resistance of the series resistor 142 and potentiometer 134. This cycle delay or dwell time provides intermittent operation of the wiper elements, useful in a misting or light rainfall situation.

The synchronized cyclic operation of the wiper elements continues so long as power is provided to the wiper relays 102,104. The wiper elements will always begin a wiping cycle in exact synchronization and will be resynchronized at the beginning of each cycle. In the event that one wiper motor 12,14 operates somewhat slower than the other, the faster motor 12,14 will always be disabled until the slower one catches up and is synchronized. The amount of deviation during a single cycle will not be sufficient to allow collision to occur.

Other aspects, objects, advantages, and uses of this invention can be obtained from a study of the drawings, the disclosure, and the appended claims.

We claim:

1. A windshield wiper control system for preventing collisions between first and second wiper elements associated with respective first and second wiper motors, comprising:
- first and second synchronizing switches associated with respective ones of said wiper elements and adapted to produce respective synchronizing signals in response to said wiper elements being positioned at corresponding predetermined cycle start locations;
- a logic circuit connected to said first and second respective ones of said wiper elements and adapted to produce respective synchronizing signals in response to said wiper elements being positioned at corresponding predetermined cycle start locations;
- a logic circuit connected to said first and second synchronizing switches and adapted to produce first and second motor control signals in response to receiving both of said first and second synchronizing signals, said logic circuit including first and second latches each having an input terminal connected to a respective one of said synchronizing switches and having an output terminal, an OR gate having first and second input terminals connected to respective ones of said latch output terminals and having an output terminal, a timer having an input terminal connected to said OR gate output terminal and having an output terminal, and first and second drive transistors each having an input terminal connectable to a respective one of said latch output terminals and having an output terminal; and
- first and second motor control relays having respective relay driver coils connected to respective ones of said logic circuit transistor output terminals and respective contact sets connected between a motor power source and respective ones of said motors, said relays being adapted to controllably deliver power to said motors in response to the status of said motor control signals.

2. A windshield wiper control system, as set forth in claim 1, wherein said logic circuit includes a variable time delay circuit adapted to controllably inhibit the production of said motor control signals for preselected variable periods of time following receipt of said synchronizing signals.

* * * * *

UNITED STATES PATENT AND TRADEMARK OFFICE
CERTIFICATE OF CORRECTION

PATENT NO. : 5,182,501

DATED : January 26, 1993

INVENTOR(S) : Daniel E. Henderson and William E. Allen

It is certified that error appears in the above-identified patent and that said Letters Patent is hereby corrected as shown below:

In claim 1, column 5, delete the third paragraph beginning on line 11 and ending on line 15.

Signed and Sealed this

Sixteenth Day of November, 1993

*Attest:*

BRUCE LEHMAN

*Attesting Officer*     Commissioner of Patents and Trademarks